(12) United States Patent
Hottebart

(10) Patent No.: US 8,578,987 B2
(45) Date of Patent: Nov. 12, 2013

(54) RUN-FLAT TIRE HAVING AN ADDITIONAL SIDEWALL REINFORCEMENT

(75) Inventor: François Hottebart, Royat (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 428 days.

(21) Appl. No.: 12/809,800

(22) PCT Filed: Dec. 15, 2008

(86) PCT No.: PCT/EP2008/067547
§ 371 (c)(1),
(2), (4) Date: Sep. 15, 2010

(87) PCT Pub. No.: WO2009/080587
PCT Pub. Date: Jul. 2, 2009

(65) Prior Publication Data
US 2011/0000597 A1 Jan. 6, 2011

(30) Foreign Application Priority Data
Dec. 21, 2007 (FR) ...................................... 07 09058

(51) Int. Cl.
*B60C 15/00* (2006.01)
*B60C 9/00* (2006.01)
*B60C 17/00* (2006.01)

(52) U.S. Cl.
USPC ............ 152/516; 152/539; 152/546; 152/555

(58) Field of Classification Search
USPC ......................................... 152/539, 546, 555
See application file for complete search history.

(56) References Cited

U.S. PATENT DOCUMENTS

| 4,261,405 A * | 4/1981 | Yamauchi et al. ............. 152/454 |
| 6,415,840 B1 * | 7/2002 | Nishikawa et al. ........... 152/458 |

(Continued)

FOREIGN PATENT DOCUMENTS

| EP | 1 527 907 | 5/2005 |
| JP | 61-081805 | 4/1986 |

(Continued)

OTHER PUBLICATIONS

Machine translation of JP 11227425, 1999.*

(Continued)

*Primary Examiner* — Justin Fischer
(74) *Attorney, Agent, or Firm* — Cozen O'Connor

(57) ABSTRACT

A run-flat tire (12) comprising: a crown; two sidewalls (40); two beads (50) each one comprising at least one annular reinforcing structure (60); a carcass reinforcement (71, 72) anchored in each of the beads by wrapping it around the annular reinforcing structure so as to form an incoming portion (711) extending from the crown through the sidewalls towards the bead and a wrapped-around portion (712); and at least one sidewall insert (80); at least one sidewall of the tire further comprising at least one additional sidewall reinforcement (90) positioned axially on the inside of the carcass reinforcement and extending radially at least between a radial height H1 of 30 mm, H1 being measured from the radially innermost point of the annular reinforcing structure; and a radial height H2 equal to 30% of the height H of the tire; and a layer (110) of polymeric composition positioned between the additional sidewall reinforcement and the carcass reinforcement.

19 Claims, 6 Drawing Sheets

(56) References Cited

U.S. PATENT DOCUMENTS

| | | |
|---|---|---|
| 6,536,495 B1 | 3/2003 | Close et al. |
| 2004/0226644 A1 | 11/2004 | Koeune et al. |
| 2008/0156409 A1 | 7/2008 | Yokakura et al. |

FOREIGN PATENT DOCUMENTS

| | | | |
|---|---|---|---|
| JP | 01297306 | * | 11/1989 |
| JP | 02-283508 | | 11/1990 |
| JP | 11227425 | * | 8/1999 |
| JP | 2002-538032 | | 11/2002 |
| JP | 2006-224837 | * | 8/2006 |
| JP | 2006-224953 | | 8/2006 |

OTHER PUBLICATIONS

Machine translation of JP 2006-224837, 2006.*

* cited by examiner

RUN-FLAT TIRE HAVING AN ADDITIONAL SIDEWALL REINFORCEMENT

This application claims the priority of French application Ser. No. 07/09058 filed Dec. 21, 2007, and U.S. Provisional application Ser. No. 61/066,990 filed Feb. 25, 2008, the entire content of both of which is hereby incorporated by reference.

RELATED APPLICATIONS

This is a U.S. national stage under 35 USC §371 of application No. PCT/EP2008/067547, filed on Dec. 15, 2008.

FIELD OF THE INVENTION

The present invention relates to run-flat tires with self supporting sidewalls.

BACKGROUND OF THE INVENTION

For a number of years, tire manufacturers have been devoting significant effort to developing novel solutions to a problem that dates back to the very start of the use of wheels fitted with tires of the inflated type, i.e. how to allow the vehicle to continue on its journey in spite of a substantial or complete loss of pressure from one or more tires. For decades, the spare wheel was considered to be the only and universal solution.

Then, more recently, the considerable advantages associated with omitting the spare wheel appeared. The idea of "extended mobility" was developed. The associated techniques allow a vehicle to continue to drive along on the same tire, even after a puncture or significant loss of pressure, provided that certain instructions are observed. This, for example, means that a service area can be reached without the need to stop, under circumstances which are often dangerous, in order to fit the spare wheel.

Today, there are two major types of run-flat technology. On the one hand, there are wheels fitted with supports capable of supporting the inside of the tread of a tire when the sidewalls collapse following a loss of pressure. This solution is advantageously combined with a tire that has a bottom region capable of minimizing the risks of the tire slipping off the rim. This solution has the advantage that the tire performance under normal conditions is very close to the performance of a conventional tire. By contrast, it does have the disadvantage of entailing the use of an additional component, namely the support, for each of the wheels of the vehicle.

On the other hand, there are tires of the self-supporting type (often known by their English-language abbreviation "ZP" which stands for "zero pressure"). These self-supporting tires are able to support a significant load at a reduced pressure, or even with no pressure, because they have sidewalls which are reinforced, usually by means of rubber inserts provided in the sidewalls. For the sake of simplicity, these tires will hereinafter be referred to as "run-flat tires".

Tires such as this are known, for example, from U.S. Pat. Nos. 4,067,347, 4,779,658, 5,511,599, 5,769,980, 5,795,416, 6,022,434 and 7,093,633.

The most widespread design of run-flat tires involves anchoring the carcass reinforcement by wrapping it around the annular reinforcing structure of the bead, so as to form, within each bead, an incoming portion extending from the crown through the sidewalls towards the bead and a wrapped-around portion, the radially outer end of the wrapped-around portion being radially close to the "equator" of the tire, that is to say radially close to the radial height at which the carcass reinforcement, when the tire is mounted on the rim, is at its largest axial width. The space formed between the incoming portion and the wrapped-around portion of the carcass reinforcement is filled with a layer of rubber mix known as the apex rubber, as is depicted in FIG. 1.

These tires, particularly when greatly flexed may, both in "normal running mode" (that is to say when inflated to a pressure close to their service pressure) and in "run-flat mode" (that is to say when the inflation pressure of the tire is significantly reduced with respect to the service pressure, or even when there is no inflation pressure at all), give rise to endurance problems in the "bottom region" that is to say in the beads and in the radially inner part of the sidewalls, the cause for this generally being attributed to the fact that the wrapped-around portion of the carcass reinforcement may find itself under compression when the bead, which is bearing against the rim hook, bends about the hook (as depicted in FIG. 10). As a matter of fact, because of the great thickness of the rubber mix between the incoming portion and the wrapped-around portion of the carcass reinforcement, the wrapped-around portion may find itself under significant compressive stress resulting from the bending of the radially inner part of the sidewall, (which can be likened to a beam) about the rim hook.

In order to address this problem, it has been proposed that the thickness of the rubber mix between the incoming portion and the wrapped-around portion of the carcass reinforcement be reduced significantly (giving rise to a tire "with close-fitting wrapped-around portion") and/or to reduce significantly the radial height of the wrapped-around portion (this giving a "tire with shortened wrapped-around portion"). While a wrapped-around portion configuration such as this has proven advantageous from a number of standpoints (better endurance in "normal running mode", reduction in the length of the carcass reinforcement, and therefore in the weight and cost of manufacture, option to use reinforcing elements with lower compressive strength, etc.), it has not yielded entirely satisfactory results particularly under run-flat conditions.

SUMMARY OF THE INVENTION

An object of the invention is to improve the endurance, particularly in "normal running mode", of run-flat tires having self-supporting tires, and in particular the endurance of parts of the tire that lie radially on the inside of the equator of the tire.

This object is achieved in accordance with one aspect of the present invention directed to a run-flat tire configured to be mounted on a rim, comprising:
  a crown comprising a crown reinforcement surmounted by a tread;
  two sidewalls extending the crown radially inwards; two beads radially internal to the sidewalls and each comprising at least one annular reinforcing structure;
  a carcass reinforcement anchored in each of the beads by a portion turned back around the annular reinforcing structure so as to form, in each bead, an incoming portion extending from the crown through the sidewalls towards the bead, and a wrapped-around portion; and
  at least one sidewall insert axially internal to the carcass reinforcement, comprising at least one polymeric compound.

At least one sidewall of a tire according to an embodiment of the invention further comprises:
  at least one additional sidewall reinforcement comprising at least one layer of reinforcing elements and positioned axially on the inside of the carcass reinforcement, this additional sidewall reinforcement extending radially at least between:
- (a) a radial height H1 of 30 mm, H1 being measured from the radially innermost point of the annular reinforcing structure;
- (b) a radial height H2 equal to 30%, and preferably equal to 40%, of the height H of the tire; and
- a layer of polymeric compound positioned between the additional sidewall reinforcement and the carcass reinforcement, over at least a portion of the additional sidewall reinforcement, the maximum axial thickness EM of the layer of polymeric compound positioned between the additional sidewall reinforcement and the carcass reinforcement being greater than or equal to 3%, and preferentially greater than or equal to 5%, of the height H of the tire.

The thickness of the layer of polymeric compound does have to be thick enough that it can generate enough rigidity in the run-flat mode. This rigidity is generated by the compressing of the volume of rubber contained between the rim hook and the additional sidewall reinforcement in a deformation of the bending type. The thickness of the layer of polymeric compound needs to increase with H because the load bearing capability of the tire increases with H and the structural rigidity of the sidewall decreases with H.

This structure makes it possible to improve the endurance of the tire in that part of the sidewalls which lies radially on the inside of the equator of the tire.

This result can be understood through the fact that the additional sidewall reinforcement is not as strongly tensioned as the incoming portion of the carcass reinforcement of a conventional tire. This lower tension is associated with the fact that the additional sidewall reinforcement is physically distinct from the carcass reinforcement. The reduction in the tension in the additional sidewall reinforcement has the effect of offsetting the neutral axis of the bead and of the radially inner part of the sidewall towards the rim hook. In doing this, the compression in the reinforcing elements closest to the rim hook is reduced, and this has a beneficial effect on tire endurance.

Surprisingly, it has been found that the presence of the additional sidewall reinforcement, combined with a layer of polymeric compound, makes it possible to improve not only the endurance under normal running conditions (cf. above line of argument) but also the endurance under run-flat conditions with respect to damages arising in the bead (where one might have expected the situation to be equivalent to that of a conventional run-flat tire because the additional sidewall reinforcement is under tension when the tire is running flat).

The invention relates both to tires with "shortened wrapped-around portions", that is to say ones in which the radial distance DR between the radially outer end of the wrapped-around portion and the radially innermost point of the annular reinforcing structure is less than or equal to 25 mm, and tires of the "close-fitting wrapped-around portion" type, that is to say ones in which (i) the radial distance DR between the radially outer end of the wrapped-around portion and the radially innermost point of the annular reinforcing structure is greater than 25 mm, and (ii) the maximum axial distance between the incoming portion and the wrapped-around portion in the radial region between: (A) those points on the wrapped-around portion which lie a radial distance H0 of 25 mm away from the radially innermost part of the annular reinforcing structure and (B) the radially outer end of the wrapped-around portion, is less than or equal to 3 mm.

According to one preferred embodiment, the additional sidewall reinforcement comprises, in any radial section, in the radial region contained between the radial heights H1 and H2, as defined above, at least one concave portion with the concave side facing axially outwards. The effect of this concave feature is to increase the effectiveness with which the additional sidewall reinforcement can be prevented from becoming tensioned under the effect of the inflating of the tire. As a preference, this concave portion extends, in any radial section, over at least 50% of the length of the trace of the additional sidewall reinforcement contained in the radial region situated between the points on the additional sidewall reinforcement that lie a radial distance H1 away from the radially innermost point of the annular reinforcing structure, and the points which lie a radial distance H2 away from this same point of the annular reinforcing structure.

According to one advantageous embodiment, the radial distance between the radially outer end of the additional sidewall reinforcement and the radially innermost point of the annular reinforcing structure is inferior or equal to 80%, and preferentially inferior or equal to 70%, of the height H of the tire. Even more preferentially, in any radial section, the radially outer end of the additional sidewall reinforcement lies radially on the inside of the axial straight line that passes through those points on the sidewalls where the carcass reinforcement is at its greatest axial width when the tire is mounted on the rim. In other words, the radially outer end of the additional sidewall reinforcement lies radially on the inside of the equator of the tire. This embodiment is advantageous in so far as the presence of the additional sidewall reinforcement in the region radially on the outside of the equator increases the thickness of the sidewall, and this is detrimental both to comfort and endurance (in the sidewall) under run-flat conditions. In addition, extending the additional sidewall reinforcement increases the cost of manufacturing the tire.

According to one advantageous embodiment, the additional sidewall reinforcement is extended radially to the outside of the height H2 by a portion tangential to the carcass reinforcement. That portion of the additional sidewall reinforcement that has its concave side facing axially outwards is therefore extended by a portion in which the direction of curvature of the additional sidewall reinforcement is reversed, so that the reinforcement meets the carcass reinforcement not at a sharp angle but tangentially. The advantage associated with this embodiment lies in the fact that the transition from the low-tension regions to the taut regions occurs less abruptly, thereby increasing the endurance of the tire in the transition region.

According to one preferred embodiment, the radial distance DRE between the radially outer end of the additional sidewall reinforcement and the radially innermost point of the annular reinforcing structure is greater than or equal to 25% of the height H of the tire.

As a preference, the radial distance DRI between the radially inner end of the additional sidewall reinforcement and the radially innermost point of the annular reinforcing structure is less than or equal to 40 mm. A radial distance in excess of 40 mm would have the effect of reducing the impact of the additional sidewall reinforcement in the region where the bead bears against the rim hook, and this would lessen its effect on the run flat endurance of the tire.

If provision is made for the additional sidewall reinforcement to enter the bead then it is preferable for it to be extended by a portion wound partially around the annular reinforcing structure, the carcass reinforcement being positioned between the annular reinforcing structure and the additional sidewall reinforcement. This then distributes the stresses more uniformly through the carcass reinforcement and the additional sidewall reinforcement.

According to one advantageous embodiment, the additional sidewall reinforcement comprises a single layer of threadlike reinforcing elements, the threadlike reinforcing elements being oriented radially. This configuration has the advantage of greater simplicity and lower cost of manufacture.

It is, however, possible to conceive of an additional sidewall reinforcement comprising two layers of threadlike reinforcing elements, the reinforcing elements of each layer being parallel to one another, and the reinforcing elements of one layer extending crosswise with respect to those of the next. In this configuration, it is preferable to ensure that the reinforcing elements of the two layers are inclined at an angle less than or equal to 10° with respect to the radial direction, which allows to take full advantage of the structural rigidity of a double cross ply.

It is also possible to provide an additional sidewall reinforcement comprising at least one layer of fabric.

As far as the axial distance between the radial ends of the additional sidewall reinforcement and the carcass reinforcement is concerned, there are two preferred embodiments. First, it may be advantageous to ensure that the axial distance between at least one radial end (and preferably both radial ends) of the additional sidewall reinforcement and the carcass reinforcement is less than 2 mm.

Alternatively, it may be preferable to keep the radial ends of the additional sidewall reinforcement as far away from the carcass reinforcement as possible so as to limit the tension that the additional sidewall reinforcement has to bear under normal running conditions, this having the effect of improving both ride comfort and the endurance of the tire.

According to a preferred embodiment, the maximum axial thickness of the layer of polymeric compound positioned between the additional sidewall reinforcement and the carcass reinforcement is greater than or equal to 10% of the maximum axial thickness of the sidewall of the tire in the radial region over which the additional sidewall reinforcement extends. This then is the minimum needed to obtain a significant offset of the neutral axis, as mentioned above.

As a preference, the composition of the polymeric compound positioned between the additional sidewall reinforcement and the carcass reinforcement is identical to the composition of the polymeric compound of the sidewall insert. Making this choice makes it possible to reduce the number of polymeric compounds used in the manufacture of the tire and, therefore, the cost of manufacture.

The reinforcing elements in the additional sidewall reinforcement may be textile reinforcing elements such as rayon cords. As a preference, the reinforcement elements in the additional sidewall reinforcement are metal reinforcing elements because metal is a material well suited to be stressed essentially in extension in the additional sidewall reinforcement. These reinforcing elements may have a linear or practically linear force-elongation curve or, on the other hand, this curve may be highly nonlinear. In the latter instance, preference may be given to the use of reinforcing elements that have low rigidity at low elongation (so as to minimize the rigidity when running with the tire inflated) and great rigidity at long elongation (in order to maximize the rigidity under run-flat conditions).

DETAILED DESCRIPTION OF THE INVENTION

Figure 1:
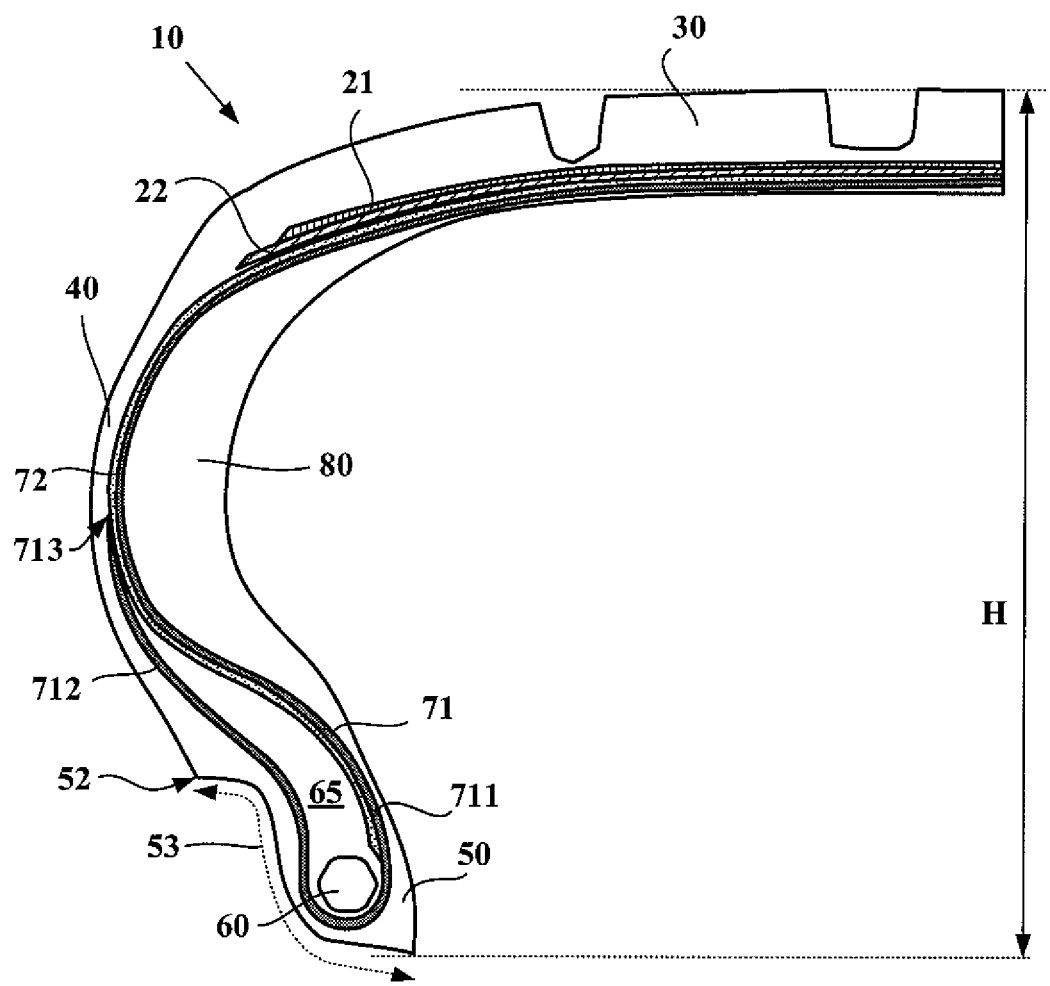
FIGS. 1 and 2 depict, in radial section, part of a run-flat tire according to the prior art.

In the context of this document, "run flat mode" or "run-flat conditions" denotes a running mode where the tire inflation pressure is significantly reduced with respect to the service pressure, or even is at zero pressure, for example after a serious tire puncture. This running mode is sometimes also termed "running in degraded mode". By contrast, this text refers to "normal running mode" or "normal running conditions" when the tire is inflated to its service pressure.

It is appropriate in the use of the term "radial" to make a distinction between the various different ways in which those skilled in the art employ this word. Firstly, the expression refers to a radius of the tire. It is in this sense that a point A is said to be "radially on the inside of" a point B (or "radially inside" the point B) if it is closer to the axis of rotation of the tire than is point B. Conversely, a point C is said to be "radially on the outside of" a point D (or "radially outside" the point D) if it is further away from the axis of rotation of the tire than is point D. Progress towards smaller (or larger) radii will be termed progress "radially inwards (or outwards)". This meaning of the term also applies where radial distances are involved.

By contrast, a thread or a reinforcement is said to be "radial" when the thread or the reinforcing elements of the reinforcement make an angle greater than or equal to 65° and less than or equal to 90° with the circumferential direction. Let us specify that in this document, the term "thread" is to be understood in its broadest possible sense and to include threads in the form of monofilaments, multifilaments, a cord, a yarn or an equivalent assembly, irrespective of the material of which the thread is made or the surface treatment it may have received in order to increase its adhesion to the rubber.

Finally, a "radial section" or "radial cross section" must be understood here to mean a section or cross section on a plane containing the axis of rotation of the tire.

An "axial" direction is a direction parallel to the axis of rotation of the tire. A point E is said to be "axially on the inside of" a point F (or "axially inside" the point F) if it is closer to the mid plane of the tire than is point F. Conversely, a point G is said to be "axially on the outside of" a point J (or "axially outside of" the point J) if it is further from the mid-plane of the tire than is point J. The "mid plane" of the tire is the plane normal to the axis of rotation of the tire and which lies midway between the annular reinforcing structures of each bead.

A "circumferential" direction is a direction perpendicular both to a radius of the tire and to the axial direction.

The "equator" of the tire is to be understood, in the context of this document, to mean the radial height of the point of greatest axial extension of the carcass reinforcement. In a radial section through the tire, the equator appears as the axial straight line passing through the points at which the carcass reinforcement has its greatest axial width when the tire is mounted on the rim. When the carcass reinforcement reaches this greatest axial width at several points, the radial height of the point closest to mid height H/2 of the tire is considered to be the equator of the tire. The equator thus defined must not be confused with the mid plane of the tire which is sometimes also known as the "equator" in documents of the prior art.

The "deflection" of a tire is to be understood to mean the difference between the radius of the tire in its unladen state and the vertical distance between the axis of rotation of the tire in its laden state and the ground on which the tire is standing.

The term "insert" as used herein can refer to an element that is inserted into the tire after curing. This term is also used in a more general sense and can refer to an inner structural element of the tire, such as a rubber part of the tire which is integral with the tire and is cured together with the tire.

FIG. 1 schematically depicts, in radial section, a run-flat tire 10 according to the prior art. This tire 10 comprises a crown comprising a crown reinforcement formed of two layers of reinforcing elements 21 and 22 and surmounted by a tread 30. Two sidewalls 40 extend the crown radially inwards. The tire 10 further comprises two beads 50 radially on the inside of the sidewalls 40, each bead comprising an annular reinforcing structure, in this instance a bead wire 60, surmounted by an apex rubber 65, and a carcass reinforcement comprising two layers of reinforcing elements 71 and 72 of which one (in this instance the layer 71) is anchored to each of the beads by wrapping it around the bead wire 60, so as to form, in each bead 50, an incoming portion 711 extending from the crown through the sidewalls towards the bead, and a wrapped-around portion 712, the radially outer end 713 of the wrapped-around portion 712 being substantially midway up the height H of the tire. The carcass reinforcement therefore extends from the beads 50 through the sidewalls 40 towards the crown. The tire 10 also comprises two sidewall inserts 80, axially on the inside of the carcass reinforcements 71 and 72. These inserts with their characteristic crescent-shaped radial cross section are configured to reinforce the sidewall. They contain at least one polymeric compound, preferably a rubber mix. Document WO 02/096677 provides a number of examples of rubber mixes that can be used to form an insert such as this. Each sidewall insert 80 is capable of contributing to withstanding a load corresponding to a substantial part of the weight of the vehicle in a situation in which the inflation pressure is appreciably reduced or zero.

Figure 10:
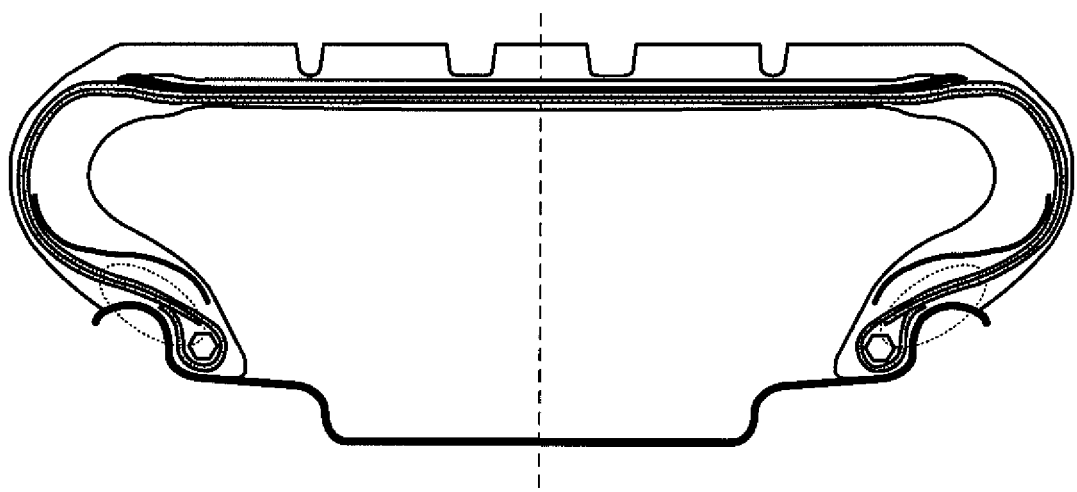

Tires of this type, particularly when strongly deflected, may, both under normal running conditions (that is to say when inflated to a pressure close to their service pressure) and under run-flat conditions (that is to say when the tire inflation pressure is significantly lowered with respect to the service pressure or even zero pressure) exhibit problems with endurance in the "bottom region", that is to say in the beads 50 and in the radially inner part of the sidewalls 40, the cause for this generally being attributed to the fact that the wrapped-around portion 712 of the carcass reinforcement is under compression when the bead 50, which is bearing against the rim hook (not depicted) bends about the hook (see FIG. 10). As a matter of fact, because of the substantial thickness of the rubber mix between the incoming portion and the wrapped-around portion of the carcass reinforcement, the wrapped-around portion may find itself under significant compressive stress resulting from the bending of the radially inner part of the sidewall (which may be likened to a beam) about the rim hook.

Figure 2:
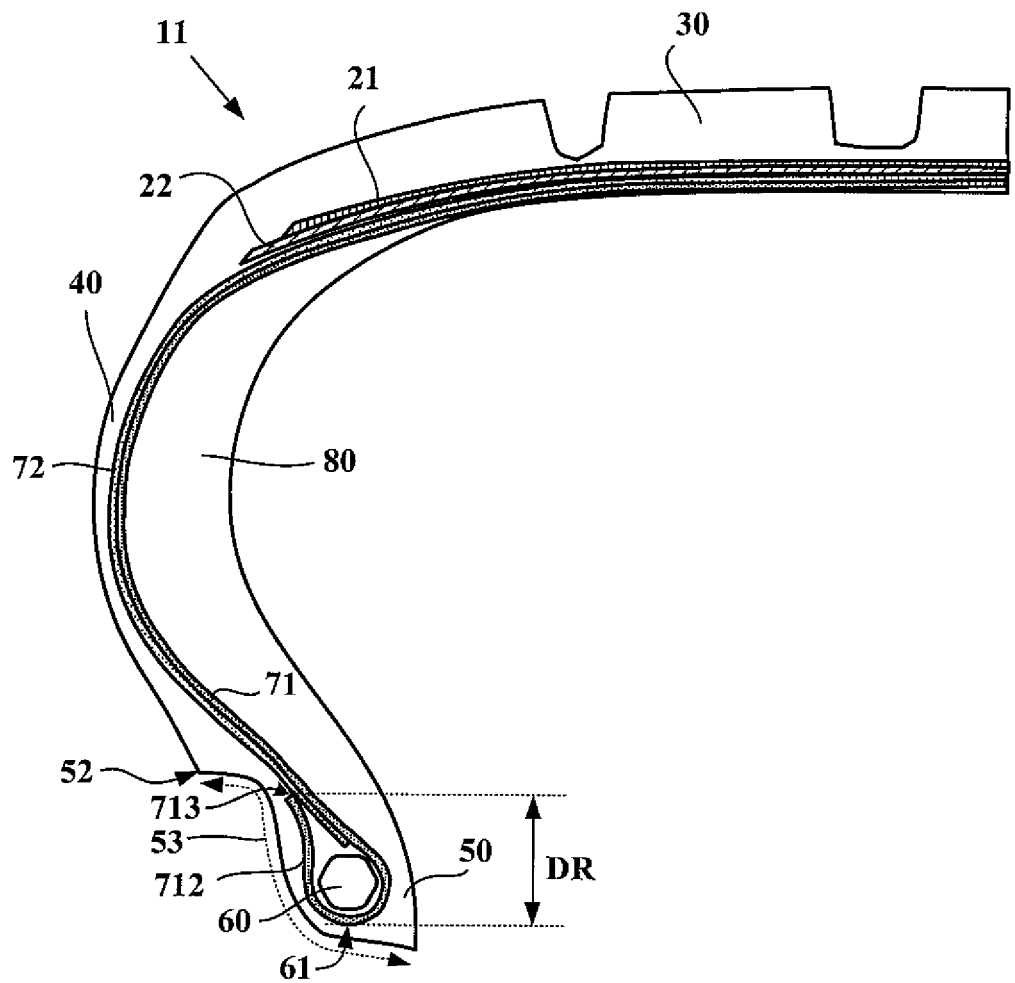

To address this problem, proposals have been made to reduce significantly the thickness of rubber mix between the incoming portion and the wrapped-around portion 712 of the carcass reinforcement (tires of the "close-fitting wrapped-around portion" type), and/or the radial height of the wrapped-around portion (tires of the "shortened wrapped-around portion" type). FIG. 2 depicts a tire 11 of the "shortened wrapped-around portion" type. In the tire 11, the radially outer end 713 of the wrapped-around portion is radially inside the radially outermost point 52 of the part 53 of the bead that is configured to bear against the rim hook. More generally, in this type of tire with a shortened wrapped-around portion, the radial distance DR between (i) the radially outer end 713 of the wrapped-around portion, and (ii) the radially innermost point 61 of the bead wire 60 is less than or equal to 25 mm.

Tires of the type depicted in FIG. 2, although they contain an equivalent amount of rubber mix by comparison with the tire of FIG. 1, have not, however, yielded entirely satisfactory results in terms of endurance, particularly under run-flat conditions.

The tires depicted in FIGS. 3 to 10 afford a solution to this technical problem.

Figure 3:
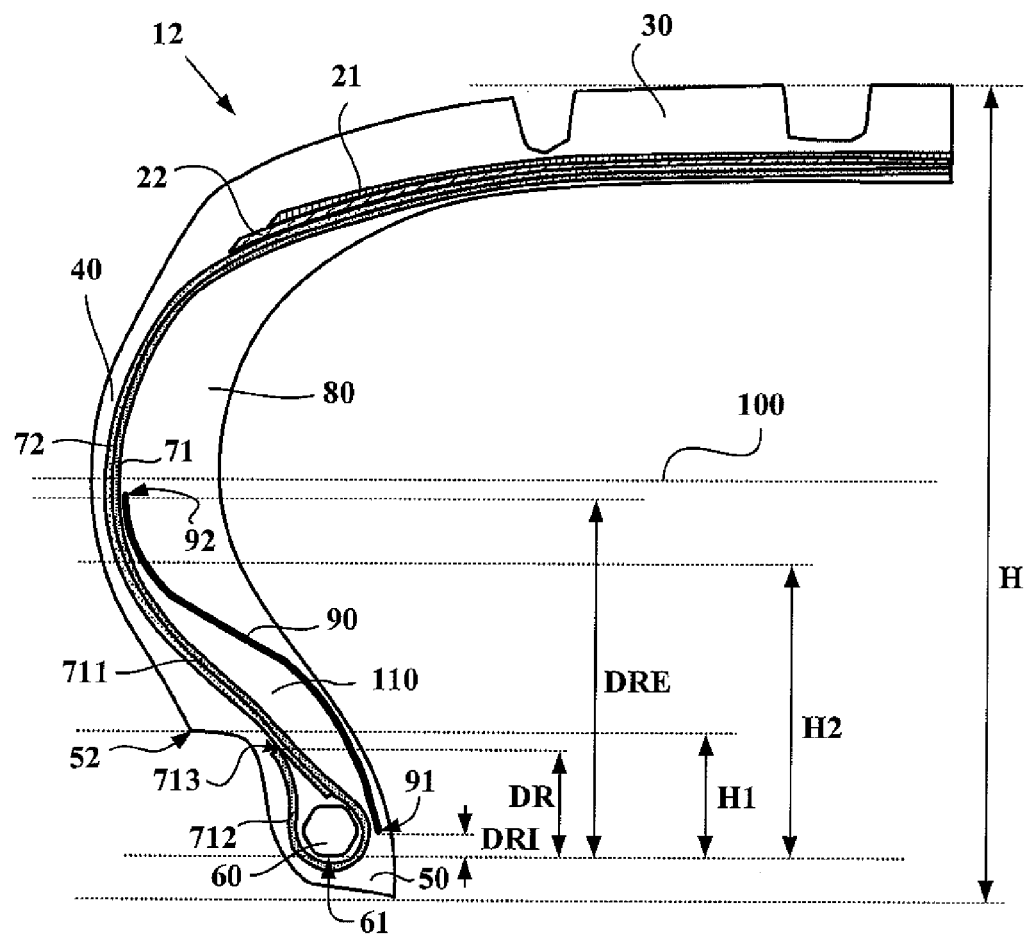
FIGS. 3 and 6 to 10 depict, in radial section, part of a run-flat tire according to embodiments of the invention.
Figure 4:
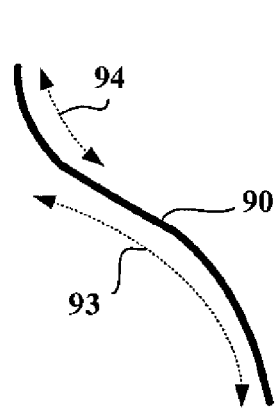
FIGS. 4 and 5 each depict a detail of FIG. 3.

FIG. 3 depicts a run-flat tire 12 configured to be mounted on a rim, comprising a crown comprising a crown reinforcement formed of layers of reinforcing elements 21 and 22, which is surmounted by a tread 30, two sidewalls 40 extending the tread radially inwards, and two beads 50 radially on the inside of the sidewalls 40, each bead comprising at least one annular reinforcing structure 60.

The tire 12 further comprises a carcass reinforcement formed of two layers of reinforcing elements 71 and 72. The carcass reinforcement is anchored in each of the beads by layer 71 being turned back around the annular reinforcing structure 60 so as to form, in each bead 50, an incoming portion 711 extending from the crown through the sidewalls 40 towards the bead 50, and a wrapped-around portion 712. The boundary between the incoming portion and the wrapped-around portion is considered to lie at the intersection of the layer of reinforcing elements 71 with a plane perpendicular to the axis of rotation of the tire and containing the radially innermost point of the layer of reinforcing elements 71. The radially outer end of the wrapped-around portion 712 lies a radial distance DR of 20 mm away from the radially innermost point of the bead wire 60; in other words, this is a tire with a shortened wrapped-around portion.

The tire 12 also comprises two sidewall inserts 80 axially inside the carcass reinforcement. These inserts, with their characteristic crescent-shaped radial cross section, are configured to reinforce the sidewall. They contain at least one polymeric compound, such as a polyurethane-based compound for example, preferably a rubber mix like the rubber mixes for example the use of which is taught by document WO 02/096677, the content of which is hereby incorporated by reference. Each sidewall insert 80 is able to withstand a load corresponding to a substantial part of the weight of the vehicle in a situation in which the inflation pressure is substantially reduced or zero.

Each sidewall 40 of the tire 12 further comprises an additional sidewall reinforcement 90 comprising a layer of reinforcing elements, in this case rayon cords, and positioned axially on the inside of the carcass reinforcement.

In a tire according to an embodiment of the invention, this additional sidewall reinforcement 90 extends radially at least between (i) a radial height H1 of 30 mm, H1 being measured from the radially innermost point 61 (in this instance, a whole set of points) of the annular reinforcing structure 60, and (ii) a radial height H2, H2 being equal approximately to 30% of H, H2 also being measured from the radially innermost point 61 of the annular reinforcing structure 60.

It should be noted that if there are a number of points radially closest to the inside of the annular reinforcing structure, then any one of these points can be considered when determining the radial heights.

The additional sidewall reinforcement 90 comprises, in the radial region between H1 and H2, a concave portion 93 (see FIG. 4) with its concave face facing axially outwards. This concave face has the effect of being all the more effective at preventing the additional sidewall reinforcement from becoming tensioned under the effect of the inflating of the tire. In this instance, this concave portion extends over two thirds of the length of the trace of the additional sidewall reinforcement between the points on the additional sidewall reinforcement that lie a radial distance equal to H1 away from the radially innermost point 61 of the annular reinforcing structure 60, and the points which lie a radial distance H2 away from this same point 61 of the annular reinforcing structure 60.

In addition, each sidewall 40 of the tire 12 comprises a layer 110 of polymeric compound positioned between the additional sidewall reinforcement 90 and the carcass reinforcement, over at least a portion of the additional sidewall reinforcement 90, the maximum axial thickness EM of the layer 110 of polymeric compound positioned between the additional sidewall reinforcement and the carcass reinforcement being approximately 8 mm, i.e. 7% of the height H of the tire.

It has been found that the endurance of the tire 12 under normal running conditions in that part of the sidewalls which lies radially on the inside of the equator (shown using the straight line 100) of the tire is improved over that of a tire 11 according to the prior art.

As has already been stated, this result can be understood through the fact that the additional sidewall reinforcement 90 is not under as much tension as the incoming portion 711 of the carcass reinforcement of a conventional tire. This lower tension is associated with the fact that the additional sidewall reinforcement 90 is physically separate from the carcass reinforcement and especially with the concave face of the additional reinforcement 90 which prevents it from absorbing any significant amount of the forces generated by the inflation pressure. The reduction in the tension in the additional sidewall reinforcement 90 has the effect of offsetting the neutral fiber of the bead and of the radially inner part of the sidewall towards the rim hook (not depicted). In doing this, the compression of the reinforcing elements closest to the rim hook is lessened, and this has a beneficial effect on tire endurance.

Another advantage associated with the lower tension in the additional sidewall reinforcement 90 under normal running conditions is a reduction in the vertical stiffness of the tire 12, and, as a consequence, improved ride comfort.

A counterpart to this lower vertical stiffness may be greater stressing and greater heating of the layer 110 of polymeric compound under run-flat conditions. This counterpart can be corrected by increasing the thickness of the layer 110. In this case, the ride comfort benefit is, however, completely or partly lost.

The radially outer end 92 of the additional sidewall reinforcement 90 lies radially on the inside of the axial straight line 100 passing through the points of the sidewalls where the carcass reinforcement has its greatest axial width when the tire 12 is mounted on the rim. In other words, the radially outer end 92 of the additional sidewall reinforcement 90 lies radially on the inside of the equator of the tire. This arrangement is advantageous in so far as the presence of the additional sidewall reinforcement 90 in the region radially on the outside of the equator increases the thickness of the sidewall and this is detrimental both to ride comfort and to endurance (in the sidewall) under run-flat conditions. In addition, extending the additional sidewall reinforcement increases the cost of manufacturing the tire.

In the embodiment depicted in FIG. 3, the additional sidewall reinforcement 90 is extended radially outward from the height H2 by a portion tangential to the carcass reinforcement formed by the layers 71 and 72. The portion (arrow 93 in FIG. 4) of the additional sidewall reinforcement has a concave face facing axially outwards and is, therefore, extended by a portion (arrow 94 in FIG. 4) in which the direction of curvature of the additional sidewall reinforcement 90 is reversed, so that the reinforcement meets the carcass reinforcement not at a sharp angle but tangentially. The advantage associated with this embodiment lies in the fact that, particularly under run-flat conditions, the transfer of tension between the additional reinforcement and the upper part of the carcass ply is done less abruptly, thus increasing the endurance of the tire in the transition region.

The radial distance DRE between the radially outer end 92 of the additional sidewall reinforcement 90 and the radially innermost point of the bead wire 60 is equal here to 45% of the height H.

The radial distance DRI between the radially inner end 91 of the additional sidewall reinforcement and the radially innermost point of the bead wire 60 is equal to 10 mm. In other words, the radially inner end 91 of the additional sidewall reinforcement drops down as far as about the radial height of the bead wire 60. In general, DRI values in excess of 40 mm should be avoided because, at such radial distances, the impact that the additional sidewall reinforcement 90 has on the region in which the bead 50 bears against the rim hook is lessened, thus reducing the effect it has on the endurance of the tire under run-flat conditions.

It is not, however, desirable to provide too short a distance DRI between the radially inner end of the additional sidewall reinforcement 90 and the radially innermost point of the annular reinforcing structure 60. As a matter of fact, the distance DRI is used to govern the level of tension in the additional sidewall reinforcement and, therefore, how it contributes to the rigidity of the tire, both under normal running conditions and under run-flat conditions.

If provision is made for the additional sidewall reinforcement 90 to enter the bead, then it is preferable for it to be extended by a portion that is partially wound around the annular reinforcing structure.

Figure 6:
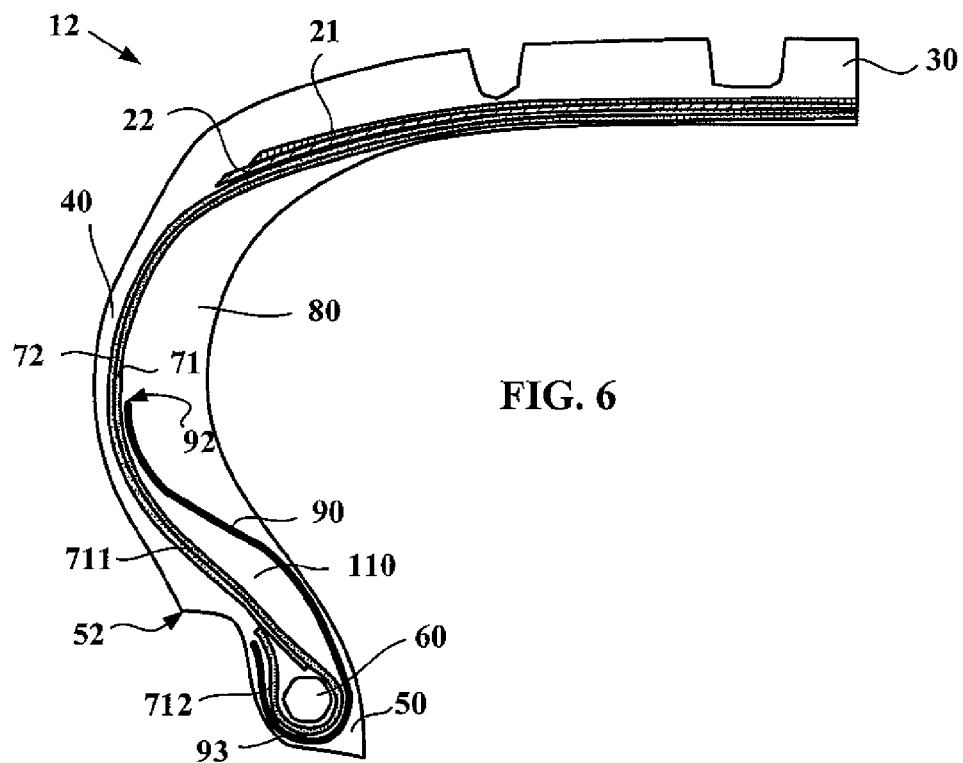

FIG. 6 depicts such a variant of a tire according to the invention in which the additional sidewall reinforcement 90 is extended by a portion 93 which is partially wound around the annular reinforcing structure.

The additional sidewall reinforcement 90 of the tire of FIG. 3 is extended, first radially inwards then axially outwards and finally radially outwards. This then gives the most uniform distribution of stress through the carcass reinforcement and the additional sidewall reinforcement 90.

Figure 5:
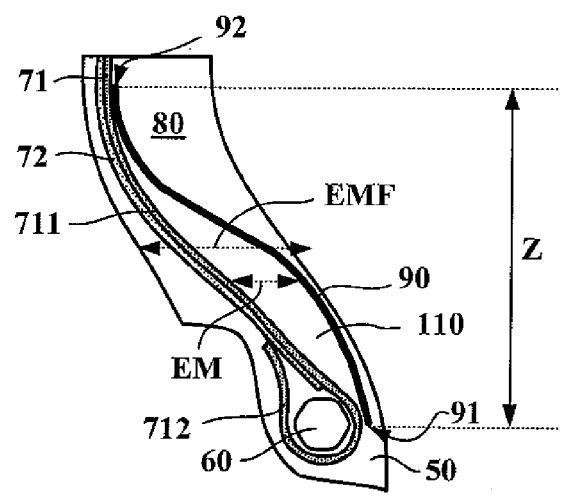

The additional sidewall reinforcement 90 of the tires depicted in FIGS. 3 and 5 comprises a single layer of threadlike reinforcing elements, in this instance, radially oriented metal threads. This configuration has the advantage of the greater ease and lower cost of manufacture.

It is also possible to use other threads: rayon, aramid, aramid/nylon hybrid (in order to benefit from the two-modulus nature of the cord: low modulus at low deformations (under normal running conditions) and high modulus at high deformations (under run-flat conditions)), polyester etc.

If the additional sidewall reinforcement 90 needs to be strengthened still further, then one possible route to follow is that of providing two (or more) layers of threadlike reinforcing elements, for example aramid cords, the reinforcing elements in each layer running parallel to one another, and the reinforcing elements of one layer extending crosswise with respect to those of the next, for example being inclined by an inclination less than or equal to 10° with respect to the radial direction.

There are two preferred embodiments regarding the axial distance between the radial ends 91 and 92 of the additional sidewall reinforcement 90 and the carcass reinforcement.

First, it may be advantageous to ensure that the axial distance between (i) at least one radial end 91 or 92 (but preferably both radial ends) of the additional sidewall reinforcement 90, and (ii) the carcass reinforcement is less than 2 mm. (If the carcass reinforcement and the additional sidewall reinforcement are reinforced with threads then this distance is measured from the back of one thread to the back of another). In other words, the additional sidewall reinforcement 90 is bonded at one end (as is the case with the tire depicted in FIG. 8) or even at both ends (as is the case with the tires depicted in FIGS. 3 and 6) against the carcass reinforcement. In that way it is possible to give the tire the same bead rigidity under run-flat conditions as the rigidity that characterizes tires of the type depicted in FIG. 1.

Figure 8:
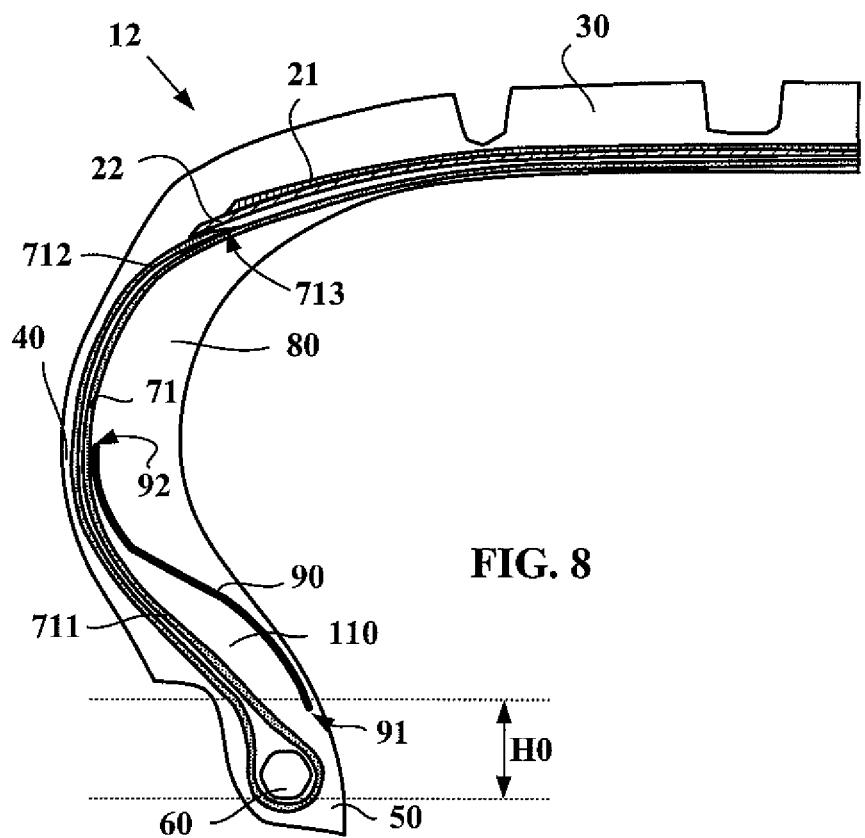

It will be noted that FIG. 8 depicts a tire with a close-fitting wrapped-around portion. The carcass reinforcement has just one layer of reinforcing elements 71. The wrapped-around portion 712 is turned back all the way to the layer of reinforcing elements 22 of the crown reinforcement; the maximum axial distance between the incoming portion 711 and the wrapped-around portion 712 between a height H0 of 25 mm and the radially outer end 713 of the wrapped-around portion 712 is less than or equal to 3 mm. Of course, that is not a feature reserved merely for the embodiment of FIG. 8. Any arrangement of additional sidewall reinforcement according to the invention may be combined with a tire of the close-fitting wrapped-around portion type.

Figure 7:
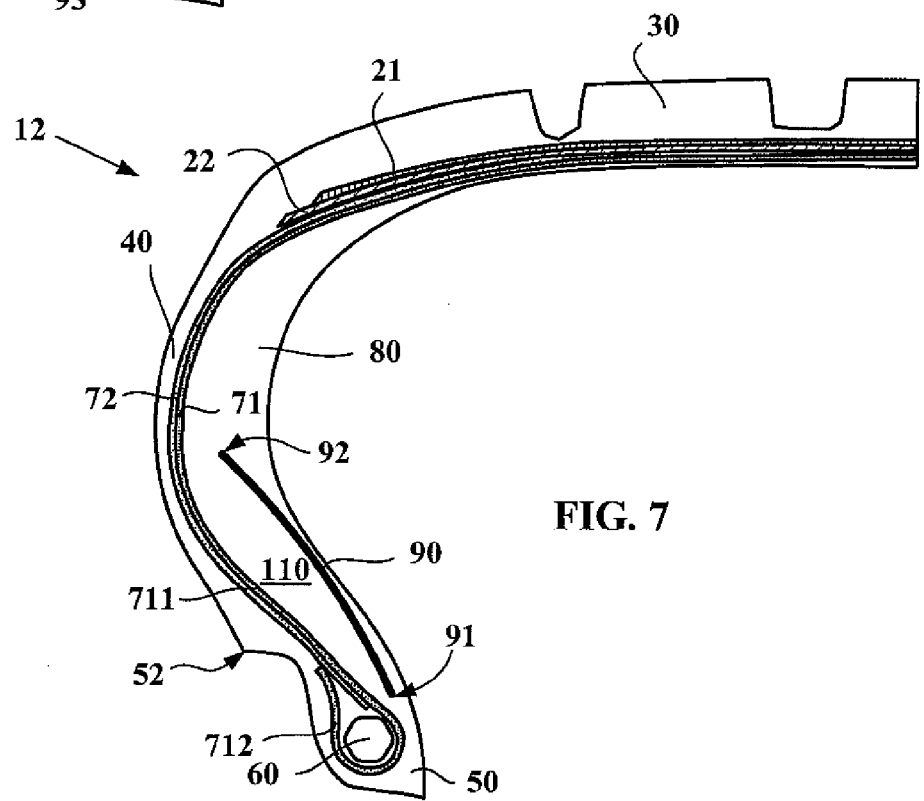

Alternatively, it may be preferable for the radial ends 91 and 92 of the additional sidewall reinforcement 90 to be kept as far away as possible from the carcass reinforcement in order to limit the tension that the additional sidewall reinforcement will absorb under normal running conditions, thus improving both ride comfort and the endurance of the tire. This embodiment is depicted in FIG. 7. Let us note that, for the tire of FIG. 7, the concave portion of the additional sidewall reinforcement 90 extends over the entire trace of the additional sidewall reinforcement.

Figure 9:
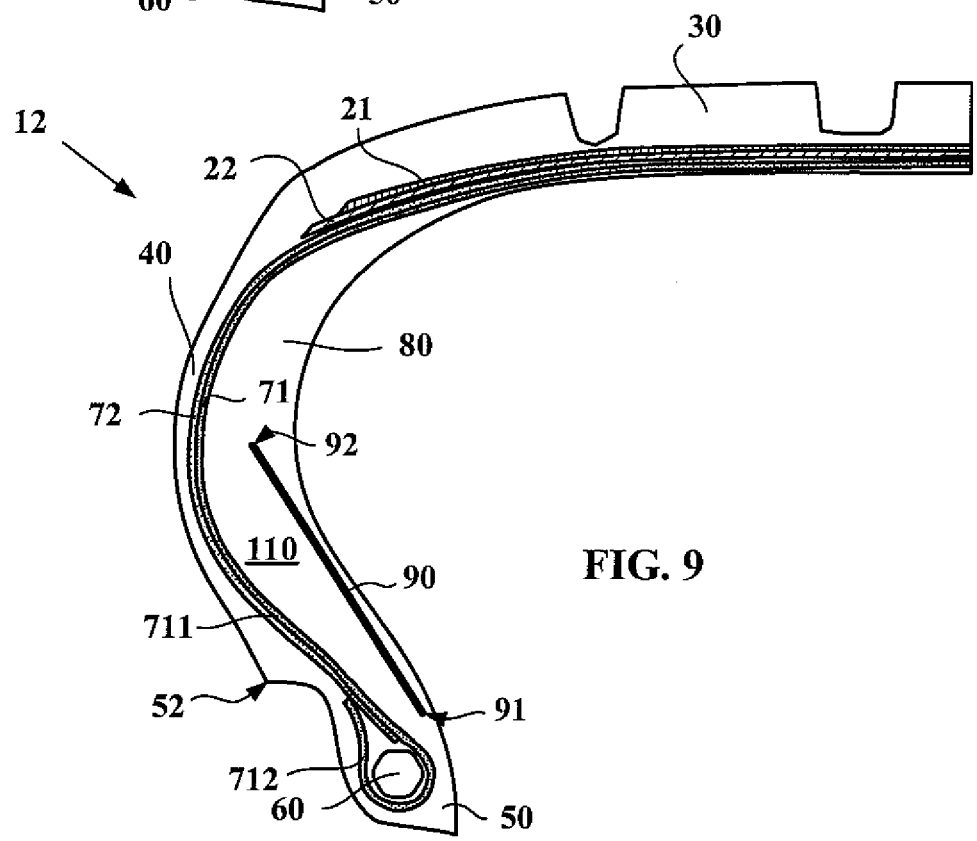

FIG. 9 depicts a particular embodiment in which the additional sidewall reinforcement 90 has no concave face and extends linearly through the sidewall 40.

The maximum axial thickness EM of the layer 110 of polymer composition deposited between the additional sidewall reinforcement and the carcass reinforcement is greater than or equal to 10% of the maximum axial thickness EMF of the sidewall 40 of the tire in the radial region Z over which the additional sidewall reinforcement 90 extends. These magnitudes are illustrated in FIG. 5 which depicts a detail of the tire of FIG. 3.

The value of 10% of the maximum axial thickness EMF of the sidewall 40 is a minimum required so that the offset of the neutral fiber as mentioned above will be highly significant.

As a preference, the composition of the polymeric compound deposited between the additional sidewall reinforcement 90 and the carcass reinforcement is identical to the composition of the polymeric compound of the sidewall insert 80. Making this choice makes it possible to reduce the number of polymeric compounds used in manufacturing the tire and therefore the cost of manufacturing it. Document WO 02/096677 provides a number of examples of rubber mixes that can be used to form an insert such as this, but those skilled in the art will understand that these examples are not imitative and that many different rubber mixes can be used as well.

Table 1 shows results obtained by numerical simulation for a size 245/50 R 18 100 Y tire. Two tires according to embodiments of the invention (one with the architecture of FIG. 3, the other with that of FIG. 8) were compared against a tire of the prior art, as depicted in FIG. 1. The calculations were done for tires with radial carcass reinforcements made of rayon. The additional sidewall reinforcement of the tires according to embodiments of the invention comprised radial threads made of rayon. The same material (with a modulus of 6 MPa at 10% elongation) was chosen for the sidewall inserts and for the layer of polymeric compound positioned between the additional sidewall reinforcement and the carcass reinforcement.

TABLE 1

|  | Maximum compression of the plies lying near to the hook [%] | | Vertical stiffness [daN/mm] |
| --- | --- | --- | --- |
|  | Pressure: 2.85 bar Load 178% of load rating | Pressure: 0 bar Load 80% of load rating | Pressure: 2.5 bar Load 80% of load rating |
| Tire of FIG. 1 | −5.2 | −11.5 | 38.5 |
| Tire of FIG. 3 | −1.7 | −6.1 | 38.1 |
| Tire of FIG. 8 | −1.6 | −6.5 | 37.4 |

A significant improvement is observed in terms of the maximum compression of the plies situated near the hook, which is a parameter associated with the endurance of the tire in this region. Ride comfort is also improved, as suggested by the values obtained for vertical stiffness.

The invention claimed is:

1. A run-flat tire configured to be mounted on a rim, comprising:
   a crown comprising a crown reinforcement surmounted by a tread;
   two sidewalls extending the crown radially inward;
   two beads radially internal to the sidewalls and each comprising at least one annular reinforcing structure;
   a carcass reinforcement anchored in each of the beads by a portion turned back around the annular reinforcing structure so as to form, in each bead, an incoming portion extending from the crown through the sidewalls toward the bead, and a wrapped-around portion; and
   at least one sidewall insert axially internal to the carcass reinforcement, comprising at least one polymeric compound;
   wherein at least one sidewall of the tire further comprises:
   (i) at least one additional sidewall reinforcement comprising at least one layer of reinforcing elements and positioned axially on the inside of the carcass reinforcement, this additional sidewall reinforcement extending radially at least between:
      (a) a radial height H1 of 30 mm, H1 being measured from the radially innermost point of the annular reinforcing structure; and
      (b) a radial height H2 equal to 30% of the height H of the tire; and
   (ii) a layer of polymeric compound positioned between the additional sidewall reinforcement and the carcass reinforcement, over at least a portion of the additional sidewall reinforcement, the maximum axial thickness EM of the layer being greater than or equal to 3% of the height H of the tire,
   wherein the additional sidewall reinforcement comprises, in any radial section, in the radial region contained between the radial heights H1 and H2, at least one concave portion with the concave side facing axially outward,
wherein the concave portion extends, in any radial section, over at least 50% of the length of the trace of the additional sidewall reinforcement contained between the points on the additional sidewall reinforcement that lie a radial distance H1 away from the radially innermost point of the annular reinforcing structure, and the points which lie a radial distance H2 away from this same point of the annular reinforcing structure.

2. The tire of claim 1, wherein, in any radial section, the radially outer end of the additional sidewall reinforcement lies radially on the inside of the axial straight line that passes through those points on the sidewalls where the carcass reinforcement is at its greatest axial width when the tire is mounted on the rim.

3. The tire of claim 1, wherein the additional sidewall reinforcement is extended radially to the outside of the height H2 by a portion tangential to the carcass reinforcement.

4. The tire of claim 1, in which the radial distance DRE between the radially outer end of the additional sidewall reinforcement and the radially innermost point of the annular reinforcing structure is greater than or equal to 25% of the height H of the tire.

5. The tire of claim 1, wherein the additional sidewall reinforcement is extended by a portion wound partially around the annular reinforcing structure.

6. The tire of claim 1, wherein the radial distance DRI between the radially inner end of the additional sidewall reinforcement and the radially innermost point of the annular reinforcing structure is less than or equal to 40 mm.

7. The tire of claim 1, wherein the additional sidewall reinforcement comprises a single layer of threadlike reinforcing elements, the threadlike reinforcing elements being oriented radially.

8. The tire of claim 1, wherein the additional sidewall reinforcement comprises two layers of threadlike reinforcing elements, the reinforcing elements of each layer being parallel to one another, and the reinforcing elements of one layer extending crosswise with respect to those of the next.

9. The tire of claim 8, wherein the reinforcing elements of the two layers are inclined at an angle less than or equal to 10° with respect to the radial direction.

10. The tire of claim 1, wherein the axial distance between at least one of the radial ends of the additional sidewall reinforcement and the carcass reinforcement is less than 2 mm.

11. The tire of claim 10, wherein the axial distance between both radial ends of the additional sidewall reinforcement and the carcass reinforcement is less than 2 mm.

12. The tire of claim 1, wherein the composition of the polymeric compound positioned between the additional sidewall reinforcement and the carcass reinforcement is identical to the composition of the polymeric compound of the sidewall insert.

13. The tire of claim 1, wherein the reinforcing elements of the additional sidewall reinforcement are textile reinforcing elements.

14. The tire of claim 1, wherein the reinforcing elements of the additional sidewall reinforcement are metal reinforcing elements.

15. The tire of claim 1, wherein the radial distance DR between the radially outer end of the wrapped-around portion and the radially innermost point of the annular reinforcing structure is less than or equal to 25 mm.

16. The tire of claim 1, wherein:
the radial distance DR between the radially outer end of the wrapped-around portion and the radially innermost point of the annular reinforcing structure is greater than 25 mm; and
the maximum axial distance between the incoming portion and the wrapped-around portion in the radial region between:
(a) those points on the wrapped-around portion that lie at a radial distance H0 of 25mm from the radially innermost point of the annular reinforcing structure, and
(b) the radially outer end of the wrapped-around portion, is less than or equal to 3 mm.

17. A run-flat tire configured to be mounted on a rim, comprising:
a crown comprising a crown reinforcement surmounted by a tread;
two sidewalls extending the crown radially inward;
two beads radially internal to the sidewalls and each comprising at least one annular reinforcing structure;
a carcass reinforcement anchored in each of the beads by a portion turned back around the annular reinforcing structure so as to form, in each bead, an incoming portion extending from the crown through the sidewalls toward the bead, and a wrapped-around portion; and
at least one sidewall insert axially internal to the carcass reinforcement, comprising at least one polymeric compound;
wherein at least one sidewall of the tire further comprises:
(i) at least one additional sidewall reinforcement comprising at least one layer of reinforcing elements and positioned axially on the inside of the carcass reinforcement, this additional sidewall reinforcement extending radially at least between:
(a) a radial height H1 of 30 mm, H1 being measured from the radially innermost point of the annular reinforcing structure; and
(b) a radial height H2 equal to 30% of the height H of the tire; and
(ii) a layer of polymeric compound positioned between the additional sidewall reinforcement and the carcass reinforcement, over at least a portion of the additional sidewall reinforcement, the maximum axial thickness EM of the layer being greater than or equal to 3% of the height H of the tire,
wherein the additional sidewall reinforcement comprises, in any radial section, in the radial region contained between the radial heights H1 and H2, at least one concave portion with the concave side facing axially outward,
wherein the additional sidewall reinforcement comprises a single layer of threadlike reinforcing elements, the threadlike reinforcing elements being oriented radially.

18. A run-flat tire configured to be mounted on a rim, comprising:
a crown comprising a crown reinforcement surmounted by a tread;
two sidewalls extending the crown radially inward;
two beads radially internal to the sidewalls and each comprising at least one annular reinforcing structure;
a carcass reinforcement anchored in each of the beads by a portion turned back around the annular reinforcing structure so as to form, in each bead, an incoming portion extending from the crown through the sidewalls toward the bead, and a wrapped-around portion; and at least one sidewall insert axially internal to the carcass reinforcement, comprising at least one polymeric compound;

wherein at least one sidewall of the tire further comprises:
(i) at least one additional sidewall reinforcement comprising at least one layer of reinforcing elements and positioned axially on the inside of the carcass reinforcement, this additional sidewall reinforcement extending radially at least between:
  (a) a radial height H1 of 30 mm, H1 being measured from the radially innermost point of the annular reinforcing structure; and
  (b) a radial height H2 equal to 30% of the height H of the tire; and
(ii) a layer of polymeric compound positioned between the additional sidewall reinforcement and the carcass reinforcement, over at least a portion of the additional sidewall reinforcement, the maximum axial thickness EM of the layer being greater than or equal to 3% of the height H of the tire, wherein the additional sidewall reinforcement comprises, in any radial section, in the radial region contained between the radial heights H1 and H2, at least one concave portion with the concave side facing axially outward, wherein the additional sidewall reinforcement comprises two layers of threadlike reinforcing elements, the reinforcing elements of each layer being parallel to one another, and the reinforcing elements of one layer extending crosswise with respect to those of the next.

19. The tire of claim 18, wherein the reinforcing elements of the two layers are inclined at an angle less than or equal to 10° with respect to the radial direction.

* * * * *